United States Patent
Nawata et al.

(10) Patent No.: US 9,718,088 B2
(45) Date of Patent: Aug. 1, 2017

(54) SEALANT FORMING NOZZLE, SEALANT FORMING APPARATUS AND SEALANT FORMING METHOD

(71) Applicant: MITSUBISHI HEAVY INDUSTRIES, LTD., Tokyo (JP)

(72) Inventors: Kenji Nawata, Tokyo (JP); Akihito Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 352 days.

(21) Appl. No.: 14/427,321

(22) PCT Filed: Sep. 13, 2013

(86) PCT No.: PCT/JP2013/074784
§ 371 (c)(1),
(2) Date: Mar. 11, 2015

(87) PCT Pub. No.: WO2014/042236
PCT Pub. Date: Mar. 20, 2014

(65) Prior Publication Data
US 2015/0217326 A1    Aug. 6, 2015

(30) Foreign Application Priority Data
Sep. 13, 2012 (JP) .................................. 2012-201592

(51) Int. Cl.
*B29C 47/12* (2006.01)
*B05C 17/005* (2006.01)
(Continued)

(52) U.S. Cl.
CPC .......... *B05C 17/00516* (2013.01); *B05D 1/26* (2013.01); *B29C 47/027* (2013.01);
(Continued)

(58) Field of Classification Search
None
See application file for complete search history.

(56) References Cited

U.S. PATENT DOCUMENTS 4,581,276 A * 4/1986 Kunert ................ B29C 47/0019
156/108
5,057,265 A * 10/1991 Kunert .................. B29C 43/206
264/161
(Continued)

FOREIGN PATENT DOCUMENTS

CN    101909766 A    12/2010
EP    2896463 A1    7/2015
(Continued)

OTHER PUBLICATIONS

Japan Patent Office, "Decision to Grant a Patent for Japanese Patent Application No. 2012-201592," Mar. 15, 2016.
(Continued)

*Primary Examiner* — Edmund Lee
(74) *Attorney, Agent, or Firm* — Manabu Kanesaka; Benjamin Hauptman; Kenneth Berner

(57) ABSTRACT

A sealant forming nozzle is disposed to seal an object that a sectional shape in a first plane is a stair shape. The sealant forming nozzle includes a shaping section and a guide section. The shaping section includes a shaping surface orthogonal to the first plane, and a sealant output hole to supply a sealant to a space surrounded by the object and the shaping surface. The guide section has a guide surface. The guide surface is orthogonal to the first plane and formed to have a line contact with a corner section of an upper step of the stair shape.

11 Claims, 10 Drawing Sheets

(51) Int. Cl.
   *B29C 47/14* (2006.01)
   *B29C 47/08* (2006.01)
   *B29C 47/02* (2006.01)
   *B05D 1/26* (2006.01)

(52) U.S. Cl.
   CPC .......... *B29C 47/0866* (2013.01); *B29C 47/12* (2013.01); *B29C 47/14* (2013.01)

(56) References Cited

U.S. PATENT DOCUMENTS

| | | | | |
|---|---|---|---|---|
| 5,108,526 | A * | 4/1992 | Cornils | B05C 5/0216 156/108 |
| 5,302,333 | A * | 4/1994 | Capriotti | B29C 33/02 156/108 |
| 5,445,780 | A * | 8/1995 | Yada | B29C 47/026 156/107 |
| 5,456,874 | A * | 10/1995 | Cordes | B29C 45/14409 156/108 |
| 5,645,785 | A * | 7/1997 | Cornils | B29C 47/0019 156/108 |
| 2011/0017138 | A1 | 1/2011 | Hoek et al. | |
| 2011/0104365 | A1 | 5/2011 | Hidaka et al. | |
| 2015/0217326 | A1 | 8/2015 | Nawata et al. | |

FOREIGN PATENT DOCUMENTS

| | | |
|---|---|---|
| JP | S54-102566 U | 7/1979 |
| JP | H09-38556 A | 2/1997 |
| JP | 2006-167676 A | 6/2006 |
| JP | 2012-152699 A | 8/2012 |
| WO | 2014/042236 A1 | 3/2014 |

OTHER PUBLICATIONS

China Patent Office, "Office Action for Chinese Patent Application No. 201380047502.3," Mar. 30, 2016.

China Patent Office, "Decision to Grant Patent for Chinese Patent Application No. 201380047502.3," Sep. 5, 2016.

Canada Patent Office, "Examination Search Report for Canadian Patent Application No. 2884501," Oct. 3, 2016.

PCT, "International Preliminary Report on Patentability for PCT/JP2013/074784," Mar. 26, 2015.

PCT/ISA/210, "International Search Report for PCT/JP2013/074784", Nov. 19, 2013.

* cited by examiner

FIG. 1
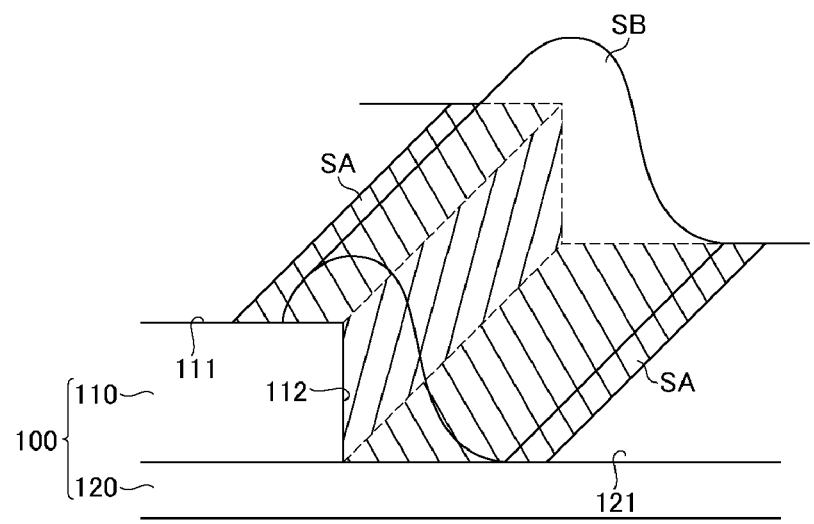
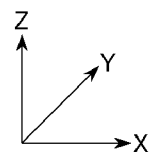

FIG. 8
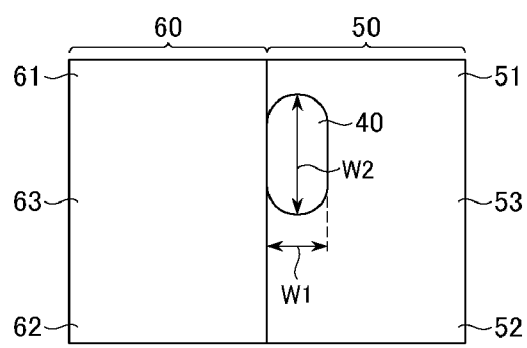
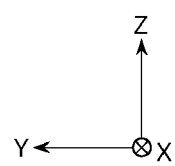

SEALANT FORMING NOZZLE, SEALANT FORMING APPARATUS AND SEALANT FORMING METHOD

RELATED APPLICATIONS

The present application is National Phase of International Application No. PCT/JP2013/074784 filed Sep. 13, 2013, and claims priority from Japanese Application No. 2012-201592, filed Sep. 13, 2012, the disclosure of which is hereby incorporated by reference herein in its entirety.

TECHNICAL FIELD

The present invention relates to a technique of applying/shaping sealant.

BACKGROUND ART

For the purpose of preventing the leakage of water, fuel and so on from a coupling section such as a tank of an aircraft, a vehicle, a car and so on, it is well known to apply sealant (sealing agent) to the coupling section. In many cases, it is required to shape the sealant so as to satisfy the prescribed outward appearance quality (size and form).

However, in case of shaping the sealant in handwork by using a spatula and so on, it is difficult to achieve the prescribed outward appearance quality, because deviations in size and shape are caused. Also, the sealant shaping takes great time.

Patent Literature 1 discloses a nozzle for shaping a sealant. According to the nozzle, a nozzle main body is formed to have a rectangular pipe shape. Also, a guide section in a front wall of the nozzle main body is shaped according to the surface shape of a work piece (sealing target). Moreover, a shaping section in a rear wall of the nozzle main body is formed so that the sealant is ejected to a desired shape. When the guide section in the front wall is turned to a direction of forward movement and then moved, the guide section in the front wall acts as a guide so that the nozzle moves along the surface of the work piece. Thus, the shaping section in the rear wall shapes the ejected sealant to a desired shape.

CITATION LIST

[Patent literature 1] JP H09-38556A

SUMMARY OF THE INVENTION

A subject matter of the present invention is to provide a technique by which a prescribed outward appearance quality can be achieved while suppressing deviations of size and shape, in case of forming (shaping) sealant.

In an aspect of the present invention, a sealant forming nozzle is provided to seal an object that a sectional shape on a first plane is a stair shape. The sealant forming nozzle includes: a shaping section configured to form (shape) a sealant; and a guide section disposed in a position which neighbors the shaping section in a first direction orthogonal to the first plane. The shaping section includes: a first contact section which contacts an upper surface of an upper step of the stair shape; a second contact section which contacts an upper surface of a lower step of the stair shape; a shaping surface and a sealant output hole. The shaping surface is orthogonal to the first plane and formed to connect the first contact section and the second contact section. The sealant output hole is disposed to supply the sealant to a space surrounded by the forming (shaping) surface and the object. The guide section has a guide surface, which is orthogonal to the first plane and formed to have a line contact with a corner section of the upper step.

In another aspect of the present invention, a sealant forming apparatus is provided. The sealant forming apparatus includes: the sealant forming nozzle as described above; and a sealant supply section configured to supply the sealant to the sealant output hole.

In a further another aspect of the present invention, a sealant forming method is provided which seals an object in which a sectional shape in a first plane is a stair shape. The sealant forming method includes (A) bringing the sealant forming nozzle into contact with the object. Here, the sealant forming nozzle includes: a shaping section configured to form (shape) a sealant; and a guide section disposed in a position which neighbors the shaping section in a first direction orthogonal to the first plane. The shaping section includes: a first contact section which contacts an upper surface of an upper step of the stair shape; a second contact section which contacts an upper surface of a lower step of the stair shape; a shaping (forming) surface and a sealant output hole. The shaping surface is orthogonal to the first plane and formed to connect the first contact section and the second contact section. The sealant output hole is disposed to supply the sealant to a space surrounded by the shaping surface and the object. The guide section has a guide surface, which is orthogonal to the first plane and formed to have a line contact with a corner section of the upper step. The sealant forming method further includes (B) supplying the sealant through the sealant output hole to the space; and (C) moving the sealant forming nozzle to the first direction while the guide section precedes to the shaping section.

According to the present invention, the prescribed outward appearance quality can be achieved while suppressing a deviation of size and shape, in case of forming (shaping) a sealant.

BRIEF DESCRIPTION OF THE DRAWINGS

FIG. 1 is a perspective view schematically showing a sealing object and a sealant according to an embodiment of the present invention.

FIG. 8 is an YZ side view schematically showing the sealant forming nozzle according to the embodiment of the present invention.

DESCRIPTION OF EMBODIMENTS

Figure 2:
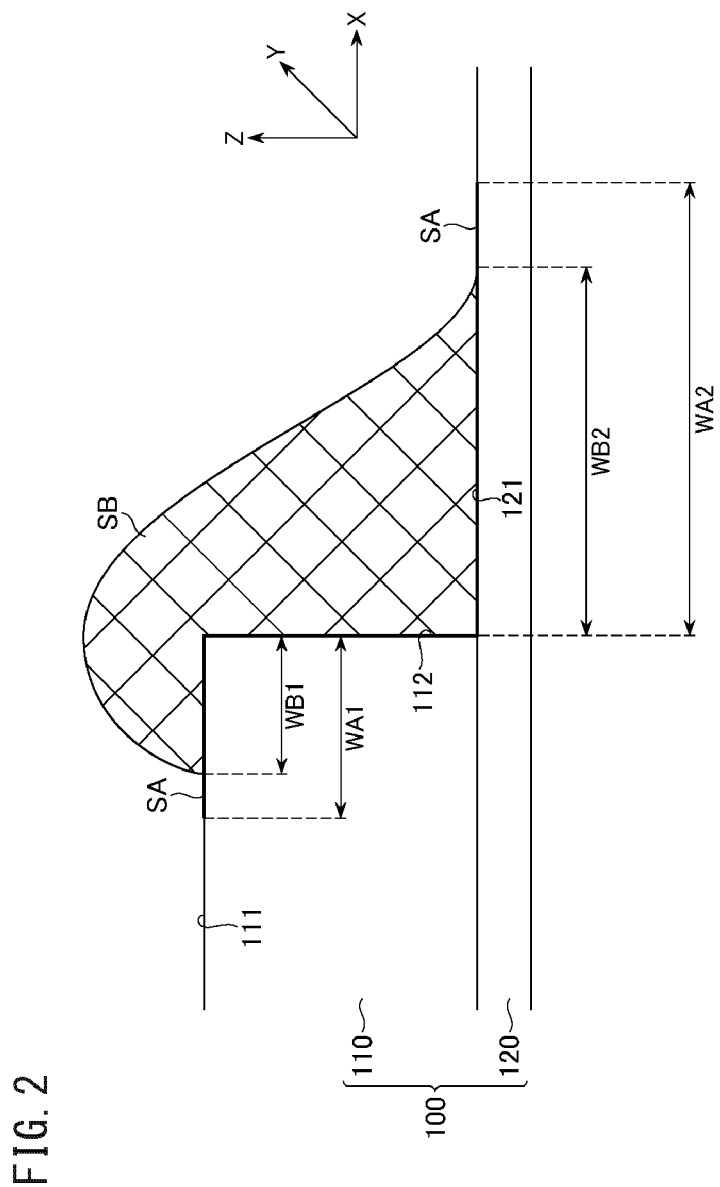
FIG. 2 is an XZ sectional view schematically showing the sealing object and the sealant according to the embodiment of the present invention.

Hereinafter, embodiments of the present invention will be described with reference to the attached drawings.

1. Sealing Object and Sealant

FIG. 1 is a perspective view schematically showing a sealing object 100 and a sealant in an embodiment. The sealing object 100 has a part where two members are laminated to form a stair. In other words, the sealing object 100 has a "stair shape".

An upper one of the two members of the stair shape is hereinafter merely referred to as an "upper step 110". On the other hand, a lower one of the two members of the stair shape is hereinafter merely referred to as a "lower step 120". The upper step 110 is stacked on the lower step 120. The stacking direction of the upper step 110 and the lower step 120 is hereinafter referred to as a "Z direction". The extension direction of the stair shape is hereinafter referred to as a "Y direction". The Y direction is orthogonal to the Z direction and moreover is parallel to a side surface 112 between the upper step 110 and the lower step 120. A direction orthogonal to both of the Z direction and the Y direction is hereinafter referred to as an "X direction". The upper surface 111 of the upper step 110 and the upper surface 121 of the lower step 120 are parallel to the XY plane. The sectional shape of the sealing object 100 in the XZ plane (first plane) is the stair shape as described above.

For example, the sealing object 100 is a wing of an aircraft. In this case, the material of the sealing object 100 is a composite material. As the composite material, fiber reinforced plastics such as carbon fiber reinforced plastics (CFRP) and glass fiber reinforced plastics (GFRP) are listed. In the step portion between the upper step 110 and the lower step 120, the fuel leakage and the sparking due to thunderbolt are easy to occur. In order to prevent such fuel leakage and sparking, it is important to apply the sealant to the step portion for protection. Especially, when the sealing object 100 is the wing of the aircraft, a fuel tank is often installed in the wing. In order to prevent flash ignition to the fuel tank, the sealing to the step portion is important.

In case of the sealing, a base layer is sometimes formed in advance on the surface of the sealing object 100 so as to improve the adhesion of sealant. Especially, when the sealing object 100 is formed of the composite material as mentioned above, the base layer is sometimes formed in advance on the surface of the sealing object 100 to improve the adhesion of sealant.

In more detail, as shown in FIG. 1, a first sealant SA for the base layer is applied thinly. The application area of the first sealant SA contains the step portion and extends from the side surface 112 of the upper step 110 and the surfaces 111 and 121 in the neighborhood of it. After that, a second sealant SB for a sealant main body is applied on the first sealant SA thickly. Typically, the viscosity of the second sealant SB is higher than that of the first sealant SA. The delamination of the second sealant SB is effectively prevented through the existence of the first sealant SA, i.e. the adhesion of sealant is improved. The first sealant SA functions as the base layer to improve the adhesion of sealant.

FIG. 2 is an XZ sectional view showing the sealant structure shown in FIG. 1. The first sealant SA is applied on the upper surface 111 of the upper step 110, the side surface 112 and the upper surface 121 of the lower step 120. The width of the first sealant SA on the upper surface 111 of the upper step 110 is WA1 in a direction opposite to the X direction from the step portion. The width of the first sealant SA on the upper surface 121 of the lower step 120 is WA2 in the X direction from the step portion. Generally, the width WA2 is greater than the width WA1 (WA2>WA1).

Also, the second sealant SB is applied on the first sealant SA. The width of the second sealant SB on the upper surface 111 of the upper step 110 is WB1 in the direction opposite to the X direction from the step portion and is smaller than the width WA1 of the first sealant SA (WB1<WA1). The width of the second sealant SB on the upper surface 121 of the lower step 120 is WB2 in the X direction from the step portion and is smaller than the width WA2 of the first sealant SA (WB2<WA2). Also, generally, the width WB2 is greater than the width WB1 (WB2>WB1).

The widths (sizes) of these sealants are prescribed from the viewpoint of the internal quality control and so on. Also, as the outward appearance shape of the second sealant SB, a constant shape is required. That is, it is required to shape the second sealant SB so as to satisfy the prescribed outward appearance quality (size and shape). However, when shaping the second sealant SB in handwork by using a spatula and so on, it is difficult to achieve the prescribed outward appearance quality because a deviation occurs in the size and shape. Also, the shaping requires a great deal of time.

Therefore, in the present embodiment, a tool is proposed which is useful to shape the second sealant SB. According to the present embodiment, as described in detail below, the prescribed outward appearance quality of the second sealant SB can be achieved while suppressing the deviation of the size and shape. It is supposed in the following description that the sealing object 100 is in a condition after the first sealant SA as the base layer is applied. That is, the surface of the sealing object 100 is the first sealant SA.

2. Sealant Forming Apparatus, and Sealant Forming Nozzle

Figure 3:
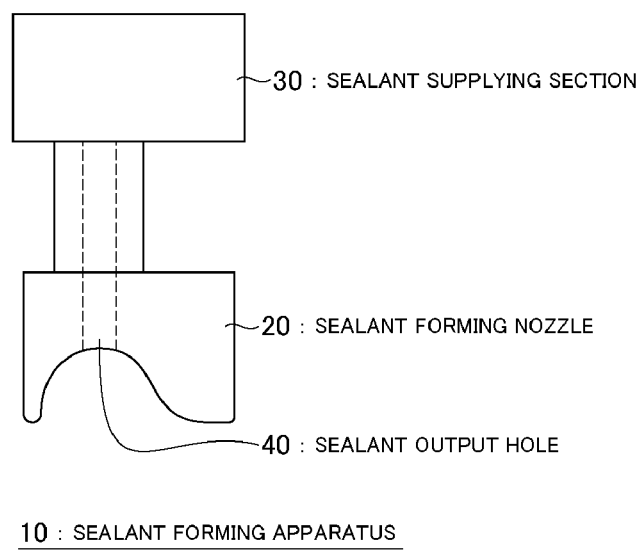
FIG. 3 is a conceptual diagram showing a sealant forming apparatus according to the embodiment of the present invention.

FIG. 3 is a conceptual diagram showing the sealant forming apparatus 10 according to the present embodiment. The sealant forming apparatus 10 includes the sealant forming nozzle 20 and a sealant supply section 30. The sealant forming nozzle 20 can be attached to the tip of sealant forming apparatus 10 and is used to carry out the application/shaping of the second sealant SB to the sealing object 100. The sealant supply section 30 supplies the second sealant SB to the sealant output hole 40 of the sealant forming nozzle 20. The second sealant SB is ejected from the sealant output hole 40 of the sealant forming nozzle 20.

Figure 4:
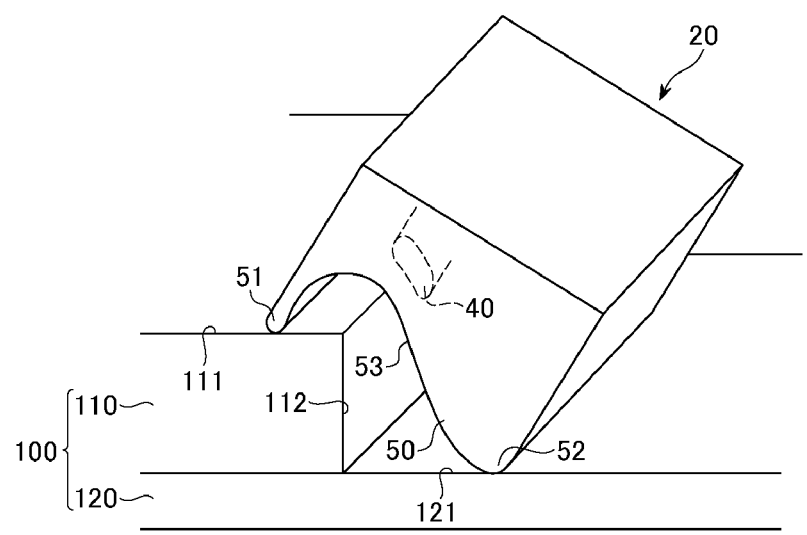
FIG. 4 is a perspective view schematically showing a sealant forming nozzle according to the embodiment of the present invention.
Figure 5:
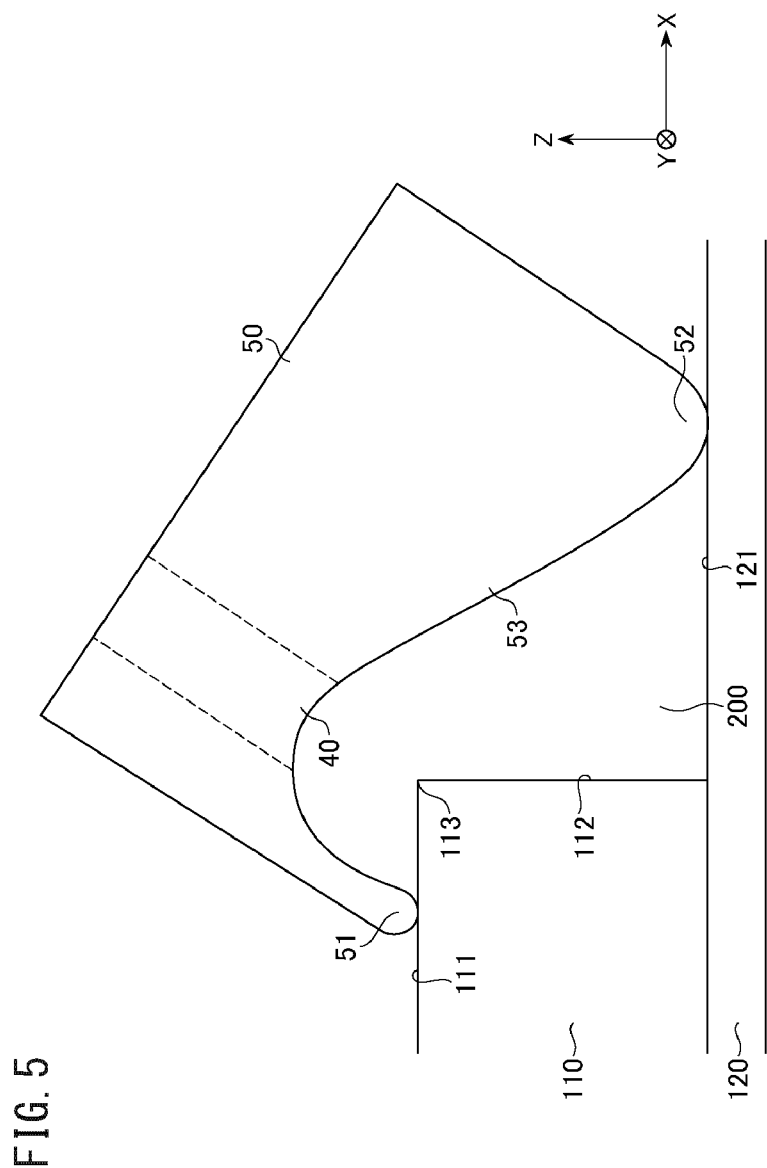
FIG. 5 is the XZ sectional view showing a shaping section of the sealant forming nozzle according to the embodiment of the present invention.

FIG. 4 is a perspective view schematically showing the sealant forming nozzle 20 according to the present embodiment. The sealant forming nozzle 20 is provided with a shaping section 50 which shapes the second sealant SB. FIG. 5 is an XZ sectional view of the shaping section 50. As shown in FIG. 4 and FIG. 5, the shaping section 50 of the sealant forming nozzle 20 is provided with a first contact section 51, a second contact section 52, a shaping surface 53 and the sealant output hole 40.

The first contact section 51 is a part which contacts the upper surface 111 of the upper step 110 of the sealing object 100, and extends to the Y direction. From the viewpoint of minimization of an influence on the first sealant SA as the base layer, it is desirable that the first contact section 51 is formed to have line contact with the upper surface 111. For example, as shown in FIG. 5, in the neighborhood of the line contact of the first contact section 51 and the upper surface 111, an intersection line of the surface of the first contact section 51 and the XZ plane is an "arc". In other words, it is desirable that the first contact section 51 is formed to have a partially circular cylinder shape to extend to the Y direction. Thus, the line contact of the first contact section 51 and the upper surface 111 is realized. In addition, such an arc shape (R shape) is favorable to make the second sealant SB to be prevailed.

The second contact section 52 is a part which contacts the upper surface 121 of the lower step 120 of the sealing object 100 and extends to the Y direction. From the viewpoint of minimization of an influence on the first sealant SA as the base layer, it is desirable that the second contact section 52 carries out line contact with the upper surface 121. For example, as shown in FIG. 5, in the neighborhood of the line contact with the second contact section 52 and the upper surface 121, the intersection line of the surface of the second contact section 52 and the XZ plane is an "arc". In other words, it is desirable that the second contact section 52 is formed through the partial circular cylinder to extend to the Y direction. Thus, the line contacts of the second contact section 52 and the surface 121 is realized. In addition, such an arc shape (R shape) is desirable to make the second sealant SB to be prevailed.

The shaping surface 53 is a surface connecting between the first contact section 51 and the second contact section 52 and is orthogonal with the XZ plane. The shaping surface 53 is designed to coincide with the prescribed shape (see FIG. 2) of the second sealant SB after forming. In other words, the shape of the shaping surface 53 is designed such that the second sealant SB of the prescribed shape is formed in the space 200 surrounded by the shaping surface 53 and the sealing object 100. As shown in FIG. 5, the shaping surface 53 has a concave section in the view from a plane connecting the first contact section 51 and the second contact section 52. Also, the shaping surface 53 is designed not to contact the corner section 113 (the boundary of the upper surface 111 and the side surface 112) in the upper step 110 of the sealing object 100.

The sealant output hole 40 is provided to supply the second sealant SB to a space 200 surrounded by the shaping surface 53 and the sealing object 100. The sealant output hole 40 is connected with the above-mentioned sealant supply section 30 and the second sealant SB is supplied from the sealant supply section 30.

Figure 6:
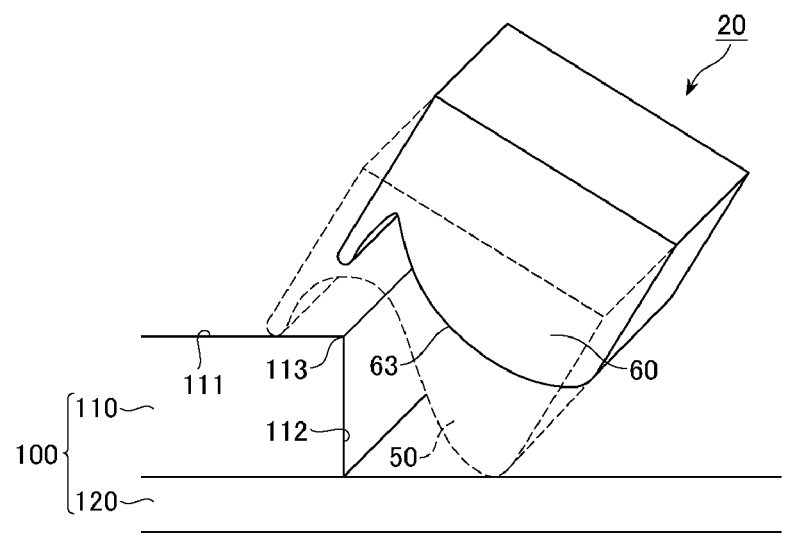
FIG. 6 is a perspective view schematically showing the sealant forming nozzle according to the embodiment of the present invention.
Figure 7:
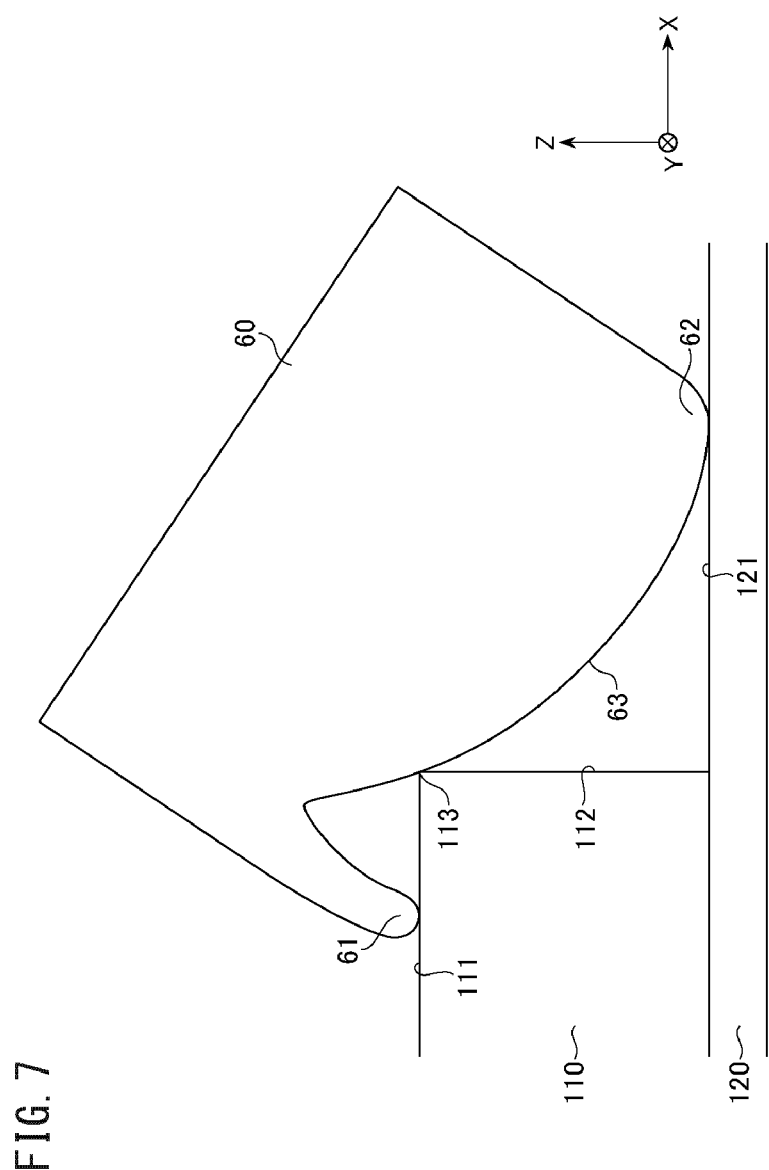
FIG. 7 is the XZ sectional view showing a guide section of the sealant forming nozzle according to the embodiment of the present invention.

FIG. 6 shows a part of the sealant forming nozzle 20 which is different from the above shaping section 50 (as could be understood, the shaping section 50 is shown by a broken line). As shown in FIG. 6, the sealant forming nozzle 20 is provided with a guide section 60 to guide the sealant forming nozzle 20 in addition to the shaping section 50. The guide section 60 is disposed in a position neighboring the shaping section 50 in the Y direction. FIG. 7 is an XZ sectional view of the guide section 60. As shown in FIG. 7, the guide section 60 of the sealant forming nozzle 20 includes a first contact section 61, a second contact section 62 and a guide surface 63.

The first contact section 61 is a part which contacts the upper surface 111 of the upper step 110 of the sealing object 100, and extends to the Y direction. For example, the first contact section 61 is connected with the first contact section 51 of the above-mentioned shaping section 50 and has the same shape as the first contact section 51.

The second contact section 62 is a part which contacts the upper surface 121 of the lower step 120 of the sealing object 100, and extends to the Y direction. For example, the second contact section 62 is connected with the second contact section 52 of the above-mentioned shaping section 50 and has the same shape as the second contact section 52.

The guide surface 63 is a surface of a part which connects the first contact section 61 and the second contact section 62 and is orthogonal to the XZ plane. The guide surface 63 is formed to have a line contact with the sealing object 100. In more detail, the guide surface 63 is formed to have the line contact with a corner section 113 (boundary of the upper surface 111 and the side surface 112) of the upper step 110 of the sealing object 100 and to have no contact with the other surfaces (111, 112, and 121). Desirably, as shown in FIG. 7, the guide surface 63 is formed to have a convex shape for the sealing object 100. For example, the intersection line of the guide surface 63 and the XZ plane is an "arc". Thus, the line contact of the guide surface 63 and the sealing object 100 can be simply realized. In case of the line contact, because the contact area between the guide surface 63 and the sealing object 100 is suppressed to be the minimum, the influence on the first sealant SA as the base layer is minimized.

FIG. 8 is an YZ side view of the sealant forming nozzle 20. The sealant output hole 40 exists on the shaping surface 53 of the shaping section 50. The guide section 60 is disposed to neighbor on one side of the sealant output hole 40. Also, the sealant output hole 40 has a vertically long shape. In detail, the traverse width w1 of the sealant output hole 40 is a width along the Y direction. On the other hand, the vertical width w2 of the sealant output hole 40 is a width of the direction along the intersection line of the shaping surface 53 and the XZ plane. At this time, the vertical width w2 is greater than the width w1 (w2>w1). In this case, the second sealant SB2 which is ejected from the sealant output hole 40 becomes easy to spread in the upper and lower directions.

3. Sealant Forming Method

Figure 9:
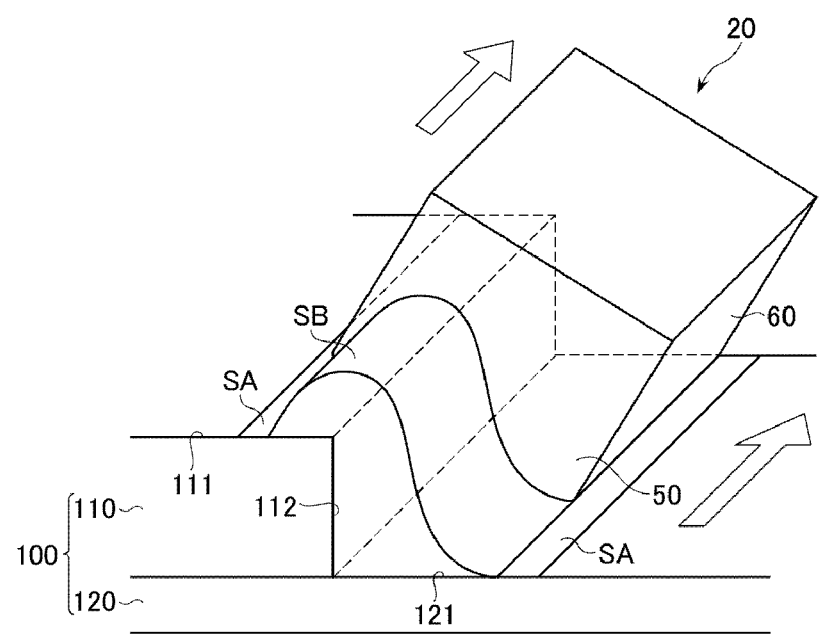
FIG. 9 is a conceptual diagram showing a method of forming the sealant according to the embodiment of the present invention.

FIG. 9 is a conceptual diagram showing a sealant forming method according to the present embodiment.

After the first sealant SA is applied, the sealant forming nozzle 20 is brought into contact with the sealing object 100. At this time, the first contact section 51 of the shaping section 50 contacts the upper surface 111 of the upper step 110 of the sealing object 100, and the second contact section 52 of the shaping section 50 contacts the upper surface 121 of the lower step 120 of the sealing object 100. Also, the guide surface 63 of the guide section 60 contacts the corner section 113 between the upper step 110 and the lower step 120 in the sealing object 100.

The sealant supply section 30 supplies the second sealant SB to the sealant output hole 40 of the sealant forming nozzle 20. The second sealant SB is supplied through the sealant output hole 40 to the space 200 surrounded by the shaping surface 53 and the sealing object 100.

The sealant forming nozzle 20 is moved (slid) to the Y direction while three-point contact with the sealing object 100 and the supply of the second sealant SB are maintained. At this time, the sealant forming nozzle 20 is moved, so that the guide section 60 precedes the shaping section 50. Thus, the second sealant SB supplied to the space 200 is formed to the prescribed shape by the shaping surface 53. That is, the second sealant SB is formed as shown in FIG. 1 and FIG. 2.

4. Effect

According to the present embodiment, the shaping surface 53 of the shaping section 50 is designed to coincide with the prescribed shape (see FIG. 2) of the second sealant SB after the forming. Also, a position shift of the shaping section 50 is prevented through the contact of the guide surface 63 of the guide section 60 with the sealing object 100. That is, the constant widths can be obtained as the widths WB1 and WB2 (see FIG. 2B) of the second sealant SB and the deviation is prevented. Therefore, by using the sealant forming nozzle 20 according to the present embodiment, the deviation of the size and shape of the second sealant SB can be suppressed. In other words, the second sealant SB can be easily formed by using the sealant forming nozzle 20 according to the present embodiment to satisfy the prescribed outward appearance quality.

Also, because it is not necessary to shape the second sealant SB in the handwork by using a spatula and so on, the time required to shape can be greatly reduced.

Moreover, according to the present embodiment, the guide surface 63 of the guide section 60 is formed to have the line contact with the sealing object 100. In detail, the guide surface 63 is formed to have the line contact with the corner section 113 between the upper step 110 and the lower step 120 in the sealing object 100 and to have no contact with the other surfaces (111, 112, 121). Thus, a contact area between the guide surface 63 and the sealing object 100 is suppressed to the minimum.

As a comparison example, the technique specified by the above-mentioned Patent Literature 1 is considered. According to the technique specified by Patent Literature 1, the guide section of the nozzle is formed according to the surface shape of the sealing object. Therefore, when the base layer is formed on the surface of the sealing object, there is a possibility that the base layer is damaged and scraped through the contact with the guide section. This becomes a factor to make the adhesion of the sealant decline.

On the other hand, according to the present embodiment, a contact area between the guide section 60 and the sealing object 100 is suppressed to the minimum. Therefore, an influence on the first sealant SA as the base layer is minimized. This means that the high adhesion of the sealant is realized. In this way, according to the present embodiment, even if the base layer is formed on the upper surface of the sealing object, the sealant can be suitably formed or shaped.

For the similar reason, it is desirable that the first contact section 51 and the second contact section 52 in the shaping section 50 have the line contacts with the sealing object 100.

Figure 10:
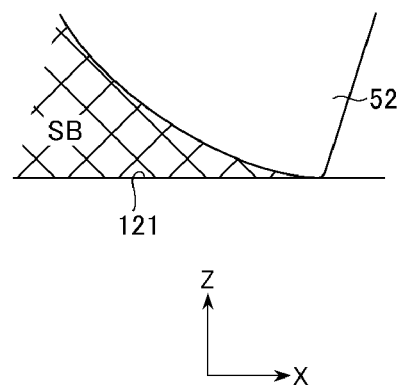
FIG. 10 is the XZ sectional view showing an effect in the embodiment of the present invention.
Figure 11:
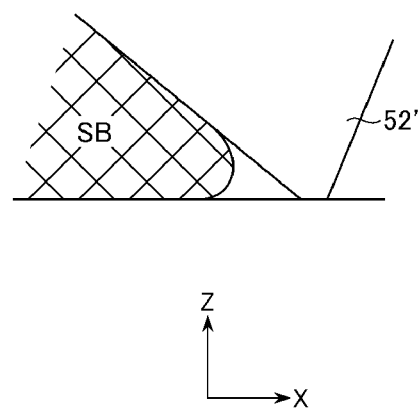
FIG. 11 is the XZ sectional view showing an effect in the embodiment of the present invention.

Also, it is desirable that the first contact section 51 and the second contact section 52 have the arc shapes (R shape) as mentioned above. FIG. 10 shows a state of the filling of the second sealant SB in case of the second contact section 52 which has the arc shape. On the other hand, FIG. 11 shows a state of the filling of the second sealant SB in case of the second contact section 52' which has a straight line shape as a comparison example. In case of the straight line shape, there is a possibility that the second sealant SB does not prevail to the corner as shown in FIG. 11 and that the "catch" occurs. On the other hand, in case of the arc shape, as shown in FIG. 10, the second sealant SB prevails to corners to prevent the generation of the "catch". It is the same as the first contact section 51. Note that these matters have been confirmed through the experiment of the present invention.

Also, it is desirable that the sealant output hole 40 has a vertically long shape as mentioned above (w2>w1). In this case, the second sealant SB2 which is ejected from the sealant output hole 40 becomes easy to spread in the upper and lower directions. Thus, this contributes to prevention of the "catch" generation.

Also, the guide section 60 is disposed only for one side of the sealant output hole 40. Supposing that the guide section 60 is disposed on both sides of the sealant output hole 40, the second sealant SB formed by the shaping section 50 would be destroyed by the guide section of a rear side.

As above, the embodiments of the present invention have been described with reference to the attached drawings. However, the present invention is not limited to the above-mentioned embodiments and can be appropriately modified in a range which does not deviate from the spirit of the present invention.

This patent application claims a priority on convention based on Japanese Patent Application No. JP 2012-201592. The disclosure thereof is incorporated herein by reference.

The invention claimed is:

1. A sealant forming nozzle for sealing an object that a sectional shape in a first plane is a stair shape, comprising:
    a shaping section configured to shape a sealant; and
    a guide section disposed in a position where neighbors the shaping section in a first direction orthogonal to the first plane,
    wherein the shaping section comprises:
    a first contact section which contacts an upper surface of an upper step of the stair shape;
    a second contact section which contacts an upper surface of a lower step of the stair shape;
    a shaping surface orthogonal to the first plane and formed to connect the first contact section and the second contact section;
    a sealant output hole disposed to supply the sealant to a space surrounded by the forming surface and the object, and
    wherein the guide section comprises:
    a guide surface orthogonal to the first plane and formed to have a line contact with a corner section of the upper step.

2. The sealant forming nozzle according to claim 1, wherein the guide surface has a convex shape.

3. The sealant forming nozzle according to claim 2, wherein an intersection line of the guide surface and the first plane is of an arc.

4. The sealant forming nozzle according to claim 1, wherein the first contact section is formed to have a line contact with the upper surface of the upper step.

5. The sealant forming nozzle according to claim 4, wherein an intersection line of the surface of the first contact section and the first plane is of an arc, in a neighborhood of a contact line between the first contact section and the upper surface of the upper step.

6. The sealant forming nozzle according to claim 1, wherein the second contact section is formed to have a line contact with an upper surface of the lower step.

7. The sealant forming nozzle according to claim 6, wherein an intersection line of a surface of the second contact section and the first plane is of an arc, in neighborhood of a contact line between the second contact section and the upper surface of the lower step.

8. The sealant forming nozzle according to claim 1, wherein a direction along the intersection line of the shaping surface and the first plane is a second direction, and
    wherein a width of the sealant output hole along the second direction is larger than that of the sealant output hole along the first direction.

9. The sealant forming nozzle according to claim 1, wherein the guide section is disposed on one side of the sealant output hole.

10. A sealant forming apparatus comprising:
    a sealant forming nozzle for sealing an object that a sectional shape in a first plane is a stair shape, wherein the sealant forming nozzle comprises:

a shaping section configured to shape a sealant; and a guide section disposed in a position where neighbors the shaping section in a first direction orthogonal to the first plane, wherein the shaping section comprises:

a first contact section which contacts an upper surface of an upper step of the stair shape;

a second contact section which contacts an upper surface of a lower step of the stair shape;

a shaping surface orthogonal to the first plane and formed to connect the first contact section and the second contact section;

a sealant output hole disposed to supply the sealant to a space surrounded by the forming surface and the object, and wherein the guide section comprises:

a guide surface orthogonal to the first plane and formed to have a line contact with a corner section of the upper step, and a sealant supply section configured to supply the sealant to the sealant output hole.

11. A sealant forming method for sealing an object that a sectional shape in a first plane is a stair shape, comprising:

(A) bringing a sealant forming nozzle into contact with the object;

wherein the sealant forming nozzle comprises:

a shaping section configured to shape a sealant; and a guide section disposed in a position which neighbors the shaping section in a first direction orthogonal to the first plane, wherein the shaping section comprises:

a first contact section which contacts an upper surface of an upper step of the stair shape;

a second contact section which contacts an upper surface of a lower step of the stair shape;

a shaping surface orthogonal to the first plane and formed to connect the first contact section and the second contact section; and a sealant output hole disposed to supply the sealant to a space surrounded by the shaping surface and the object, wherein the guide section comprises:

a guide surface orthogonal to the first plane and formed to have a line contact with a corner section of the upper step, (B) supplying the sealant through the sealant output hole to the space; and (C) moving the sealant forming nozzle to the first direction while the guide section precedes the shaping section.

\* \* \* \* \*